No. 749,357. PATENTED JAN. 12, 1904.
H. BREITSTEIN.
CHOPPING DEVICE.
APPLICATION FILED SEPT. 22, 1903.
NO MODEL.
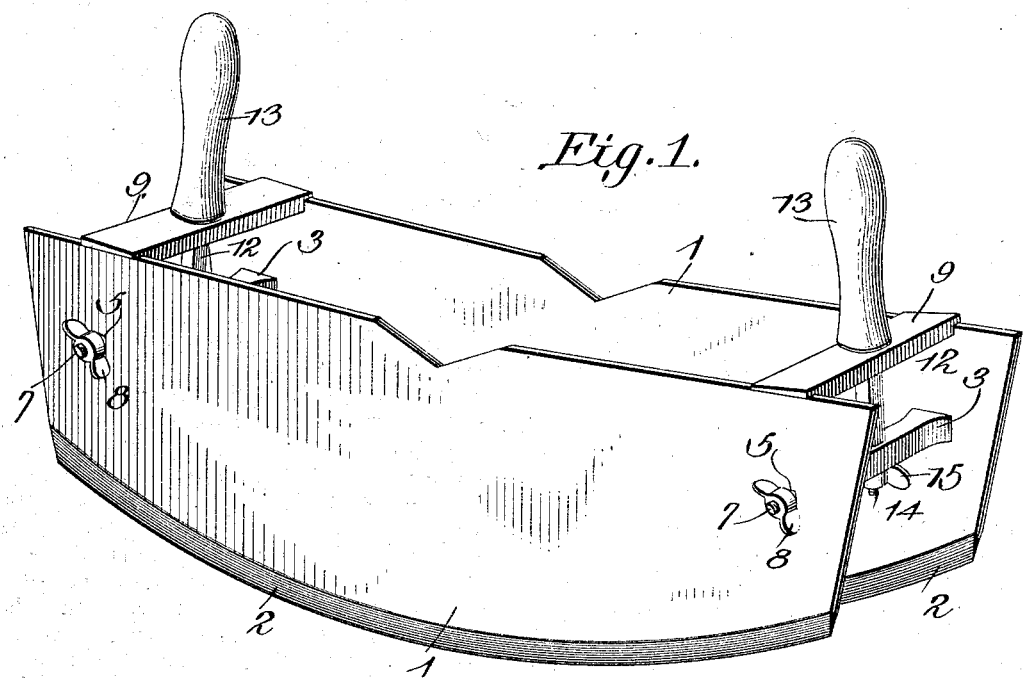
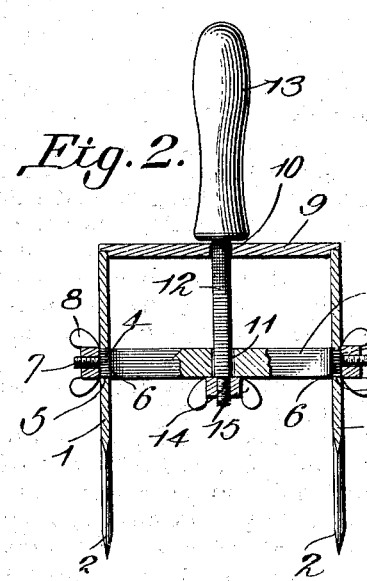
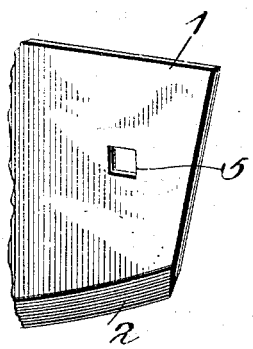
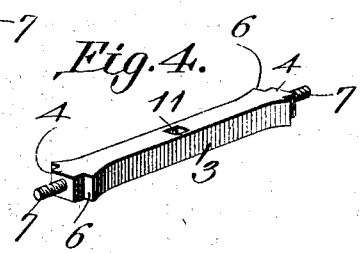
Witnesses
E. H. Stewart
F. S. Elmor
Harry Breitstein, Inventor.
by C. A. Snow & Co.
Attorneys No. 749,357. Patented January 12, 1904.

UNITED STATES PATENT OFFICE.

HARRY BREITSTEIN, OF RICHMOND, VIRGINIA.

CHOPPING DEVICE.

SPECIFICATION forming part of Letters Patent No. 749,357, dated January 12, 1904.

Application filed September 22, 1903. Serial No. 174,183. (No model.)

*To all whom it may concern:*

Be it known that I, HARRY BREITSTEIN, a citizen of the United States, residing at Richmond, in the county of Henrico and State of Virginia, have invented a new and useful Chopping Device, of which the following is a specification.

My invention relates to chopping devices of the type which are operated by hand and designed for chopping meat, vegetables, feed, &c., and has for its objects to produce a device of this character of simple construction which will be efficient in operation and one by which the chopping operation may be rapidly performed and with a minimum of exertion on the part of the operator.

To these ends the invention comprises the novel details of construction and combination of parts more fully hereinafter described.

In the accompanying drawings, Figure 1 is a perspective view of the cutter embodying my invention. Fig. 2 is a vertical transverse sectional elevation. Figs. 3 and 4 are detail perspective views.

Referring to the drawings, 1 1 designate a pair of cutting blades or knives composed, preferably, of steel plates arranged to stand vertically upon edge and having their lower edges 2 sharpened and outwardly curved from end to end longitudinally for the purpose which will later appear.

The blades 1 are disposed side by side preferably in parallelism and are spaced one from the other and maintained in such relation by connecting bars or members 3, extended transversely between the blades. The members 3, which are disposed one adjacent to each end of the device, are preferably in the form of metal bars of rectangular form in cross-section and each having at its opposite ends squared reduced extensions 4, which fit within squared openings 5, formed in the blades, the inner faces of which latter are engaged by bearing-shoulders 6, produced between the bar and reduced extension. Disposed centrally of and projecting outward from each extension 4 is an integral threaded bolt or spindle 7, designed to receive a thumb-nut 8, by which the blades are secured to the bar. It is here to be noted that by this arrangement either of the blades may be readily removed for sharpening or other purposes and that normally the blades will be maintained firmly and securely in their proper fixed relations.

Disposed above each of the members 3 is a brace-plate or member 9, provided with a central opening 10, through which and a coincident opening 11, formed through the underlying bar 3, there extends the shank 12 of an operating-handle 13, said shank being provided upon its lower end with a reduced threaded spindle 14, which receives a thumb-nut 15 beneath the bar 3. The plates are each notched or recessed at their outer ends to receive the upper edges of the adjacent blades 1, the portion of the plates which bear upon the upper edges of the blades being beveled transversely of their bearing-faces, whereby the plates will be maintained at a slight transverse inclination inward, thus maintaining the handles in a radial position relative to the curved cutting edges 2.

In practice the device stands naturally in the position illustrated in Fig. 1, and the operator grasps the handles 13 and rocks the device back and forth longitudinally upon its cutting edges 2 for chopping the material under treatment. During this operation the hands of the operator will, owing to the inclination of the handles relative to the cutting edges, swing in a perfectly free manner, and this feature, together with the fact that the device stands unaided in cutting position, serves to minimize the effort and labor entailed in manipulating the device.

In view of the above it will be seen that I produce a simple inexpensive device which at the same time is strong and durable and admirably adapted for the attainment of the ends in view. It is to be understood, however, that I do not limit myself to the precise details herein set forth, inasmuch as minor changes may be made therein without departing from the spirit of the invention.

Having thus described my invention, what I claim is—

1. In a chopping device, the combination with a pair of cutting-blades disposed side by side, of connecting members extending transversely between and maintaining the blades in spaced relation, brace-plates sustained above the members and bearing upon the inner faces of the blades, and operating-handles having shanks extended through the plates and members.

2. In a chopping device, the combination with a pair of cutting-blades disposed side by side, of connecting members extending transversely between and maintaining the blades in spaced relation, means for detachably connecting the blades with the members, brace-plates sustained above the latter and bearing upon the inner faces of the blades, and operating-handles having shanks extended through the plates and members.

3. In a chopping device, the combination with a pair of cutting-blades disposed side by side, of connecting members extending between and maintaining the blades in spaced relation, brace-plates arranged remotely above the members, said plates having their lower faces notched to receive the upper edges of the blades whereby they bear upon said edges and the inner faces of the blades, and operating-handles having shanks extended through the plates and members.

In testimony that I claim the foregoing as my own I have hereto affixed my signature in the presence of two witnesses.

H. BREITSTEIN.

Witnesses:
  A. BREITSTEIN,
  BENJ. LOVENSTEIN.